United States Patent
Kim

(10) Patent No.: US 8,055,442 B2
(45) Date of Patent: Nov. 8, 2011

(54) DETERMINING A DISPLAY POSITION OF ROAD NAME DATA AND DISPLAYING THE ROAD NAME DATA

(75) Inventor: Young In Kim, Jinhae-si (KR)

(73) Assignee: LG Electronics Inc., Seoul (KR)

( * ) Notice: Subject to any disclaimer, the term of this patent is extended or adjusted under 35 U.S.C. 154(b) by 881 days.

(21) Appl. No.: 11/276,172

(22) Filed: Feb. 16, 2006

(65) Prior Publication Data

US 2006/0195255 A1 Aug. 31, 2006

(30) Foreign Application Priority Data

Feb. 16, 2005 (KR) .................. 10-2005-0012835

(51) Int. Cl.
*G01C 21/30* (2006.01)
*G01C 21/32* (2006.01)

(52) U.S. Cl. ........ 701/208; 701/201; 701/206; 345/649; 345/442; 715/211; 715/223; 715/253; 715/273; 715/716; 715/764; 715/858; 382/113

(58) Field of Classification Search .................. 715/211, 715/221–226, 243–253, 273, 716, 764–867; 382/106, 113, 278; 345/629, 649, 442
See application file for complete search history.

(56) References Cited

U.S. PATENT DOCUMENTS

| | | | | |
|---|---|---|---|---|
| 4,527,155 A * | 7/1985 | Yamaki et al. | ................ | 345/657 |
| 4,608,656 A * | 8/1986 | Tanaka et al. | ................ | 701/212 |
| 4,661,811 A * | 4/1987 | Gray et al. | .................... | 345/636 |
| 4,737,916 A * | 4/1988 | Ogawa et al. | ................ | 701/200 |
| 4,914,605 A * | 4/1990 | Loughmiller et al. | ........ | 345/649 |
| 5,297,051 A * | 3/1994 | Arakawa et al. | .............. | 701/200 |
| 5,761,328 A * | 6/1998 | Solberg et al. | ................ | 382/113 |
| 5,928,305 A * | 7/1999 | Nomura | ........................ | 701/207 |
| 5,956,250 A * | 9/1999 | Gudat et al. | .................... | 701/26 |
| 6,565,610 B1 * | 5/2003 | Wang et al. | ................... | 715/210 |
| 6,751,609 B2 * | 6/2004 | Nomura | ............................... | 1/1 |
| 6,952,661 B2 * | 10/2005 | Agrawala et al. | ................ | 703/2 |
| 7,304,653 B2 * | 12/2007 | Ueno | ............................ | 345/649 |
| 2004/0001114 A1* | 1/2004 | Fuchs et al. | ................... | 345/855 |
| 2005/0031204 A1* | 2/2005 | Kaneko et al. | ................ | 382/190 |
| 2005/0143914 A1* | 6/2005 | Yamada et al. | ............... | 701/211 |

FOREIGN PATENT DOCUMENTS

| | | |
|---|---|---|
| EP | 0 652 418 | 5/1995 |
| JP | 2000-298027 | 10/2000 |
| WO | 86/02764 | 5/1986 |
| WO | WO 86/02764 | 5/1986 |

OTHER PUBLICATIONS example of AutCAD 14 drawing (prepared with using of AutoCAD Release May 14, 1997; Autodesk, Inc., 1997).*
Li "Data Object and Label Placement for Information Abundant Visualizations" UMD CP, 1998.*
European Search Report dated May 16, 2006; issued in European Application No. EP 06 00 3139 (8 pages).

* cited by examiner

*Primary Examiner* — Jack Keith
*Assistant Examiner* — Rami Khatib
(74) *Attorney, Agent, or Firm* — Fish & Richardson P.C.

(57) ABSTRACT

A method of determining a display position for road name data including selecting a link representing a road segment with an initial road name display position from stored map data. An angle of the selected link is calculated, and calculating an angle of the selected link, a display reference position is identified to display the road name. Updated road name display position information including the determined display reference position is stored relative to the link.

8 Claims, 9 Drawing Sheets

DETERMINING A DISPLAY POSITION OF ROAD NAME DATA AND DISPLAYING THE ROAD NAME DATA

CROSS-REFERENCE TO RELATED APPLICATIONS

This application claims priority under 35 U.S.C. §119 to Korean Patent Application No. P2005-12835, filed on Feb. 16, 2005, the entirety of which is hereby incorporated by reference.

BACKGROUND

Recently, as the number of various moving objects such as motor vehicles and the like increase, traffic congestion continues to increase. Specifically, the number of motor vehicles is increasing considerably faster than the corresponding growth in the necessary infrastructure. Navigation systems are being incorporated into motor vehicles as one of the solutions for offsetting traffic congestion.

A typical navigation system detects a current object position using navigation messages transmitted from a plurality of GPS (global positioning system) satellites and moving object drive state detecting signals detected by a plurality of sensors provided on the corresponding moving objects such as a gyroscope, a speed sensor and the like. If a current position of the moving object is detected, the detected current position of the moving object is matched to map data. The current position of the moving object is then displayed on a display unit together with a corresponding map.

The navigation system provides the functionality of searching a drive path of a moving object from an origination to a destination using the map data, and the functionality of guiding the drive path to enable the moving object to drive along the searched drive path.

If the moving object is driving along the searched drive path, the navigation system searches prescribed guide targets in front of the moving object, such as an intersection, an underpass, an overpass, a highway entrance/exit and the like. If the moving object approaches the searched guide target within a prescribed distance, the navigation system guides the drive path via a voice signal and the like.

The navigation system determines if the moving object deviates from the searched drive path and drives along another, different path. The navigation system informs a user of any deviation from the drive path to enable the user to correctly maneuver the moving object along the drive path. Therefore, the drive path of the moving object is searched and guided so that the given road system can be efficiently utilized.

In the above-explained navigation system, information relating to a perimeter area of the moving object is displayed on a map showing the perimeter area about a current location of the moving object on a display unit. The information relating to the perimeter area is provided by appropriately arranging topographical information of the perimeter area, major points, major building names, road information, road names and the like on the map to display.

The map is generated by horizontally arranging the topographical information, major points, major building names and the like so that a user can simply check them out. However, if the names of all of the roads and other landmarks are horizontally displayed, the names of the roads and landmarks may overlap.

In a typical navigation system, the road names are generally displayed parallel to the corresponding links. However, in the conventional navigation system, a cartographer making the map has to determine the positions of the road names individually, thereby requiring an inefficient and resource intensive effort.

SUMMARY

In one general aspect, a method of determining a display position for road name data includes selecting a link representing a road segment with an initial road name display position from stored map data and calculating an angle of the selected link. Based on the calculated angle of the link, a display reference position is determined to display the road name. Updated road name display position information including the determined display reference position is stored relative to the link.

Implementations of this aspect may include one or more of the following features.

Calculating the angle of the selected link includes calculating an angle in a direction of an end node of the selected link clockwise from a start node of the selected link and with reference to a true north direction.

Identifying a start node as the display reference position if a start angle ($\theta$) of the link is $0°\leq\theta<180°$ and identifying an end node as the display reference position if the calculated angle ($\theta$) of the link is not $0°\leq\theta<180°$.

The display position information includes a start point to display the road name, an angle to display the road name and a length of the road name.

The start point to display the road name is a coordinate of a start node of the link if an angle ($\theta$) between the link and a true north direction is $0°\leq\theta<180°$ and the start point is a coordinate of the end node if the angle is not $0°\leq\theta<180°$.

The angle to display the road name is an angle between an end node and a start node of the link and a true north direction.

In another general aspect, a method for determining a display position for road name data in a navigation system includes sequentially selecting links representing a road segment in a route to determine an initial road name display position from map data for the selected link. Information of a start node, a shape point and an end node is acquired for each of the selected links. A length of each of the selected links is calculated and a link is selected as a reference link based on a comparison of the lengths of the links. An angle of the reference link is calculated and a display reference position is determined to display a road name according to the calculated angle of the selected link. Road name display position information representing the display reference position is stored relative to the selected link.

Implementations of this aspect may include one or more of the following features.

The angle of the link is calculated by calculating an angle ($\theta$) between the link and in a direction of an end node of the reference link clockwise from a start node of the reference link and with reference to a true north direction.

Determining the display reference position includes identifying a start node of the reference link as the display reference position if the calculated angle ($\theta$) of the link is $0°\leq\theta<180°$, and identifying an end node of the reference link as the display reference position if the calculated angle ($\theta$) of the link is not $0°\leq\theta<180°$.

The display position information includes a start point to display the road name, an angle to display the road name, and a length of the road name.

The start point to display the road name is a coordinate of a start node of the link if an angle ($\theta$) between the link and a true north direction is 0°≦θ<180° and the start point is a coordinate of the end node if the angle is not 0°≦θ<180°.

The angle to display the road name is an angle between an end node and a start node of the link and a true north direction.

In another general aspect, a method of displaying road name data in a navigation system includes generating a map with road links using map data read from a map data storage unit. Road name display position information is acquired based upon an angle of each of the links from the map data. Road names are inserted in the map according to the acquired road name display position information.

Implementations of this aspect may include one or more of the following features.

The generation of map data includes a location of a moving object and reading the map data of a prescribed area around the detected location of the moving object.

The location of the moving object is detected by hybrid navigation, wherein hybrid navigation includes receiving a navigation message with a GPS receiver, and detecting a drive state detecting signal of the moving object with a sensor unit.

The road name road name display position information is read from the map data storage unit.

Acquiring the road name display position information includes sequentially selecting links to determine road name display positions from map data, calculating an angle of each of the selected links, determining a display reference position to display the road name according to the calculated angle of the selected links, and storing the road name display position information for the determined display reference position.

The angle of the selected link is calculated by calculating an angle (θ) between the selected link and a true north direction.

The display reference position is determined by determining the start node as the display reference position if the calculated angle (θ) of the link is 0°≦θ<180° and determining the end node as the display reference position if the calculated angle (θ) of the link is not 0°≦θ<180°.

The display position information includes a start point to display the road name, an angle to display the road name, and a length of the road name.

The start point to display the road name has a coordinate of a start node of the link if an angle (θ) between the link and a true north direction is 0°≦θ<180° and has a coordinate of the end node of the link if the angle (θ) is not 0°≦θ<180°.

The angle to display the road name is an angle (θ) between a link and a true north direction and with respect to an end node from a start node of the link if the angle (θ) is 0°≦θ<180° and is the angle (θ) with respect to the start node from the end node if the angle (θ) is not 0°≦θ<180°.

Acquiring the road name display position information includes one or more of sequentially selecting links to determine road name display positions from map data, acquiring information of a start node, shape points and end node of the selected link, calculating distances between the start node, the shape points and the end node of the link, respectively, selecting both ends of the link having the greatest distance as first and second points, respectively, calculating an angle of the link between the selected first and second points, determining a display reference position to display a road name according to the calculated angle of the link, and storing the road name display position information for the determined display reference position.

The angle of the link between the first and second points is calculated by calculating an angle (θ) between a true north direction and the link.

The first point is the display reference position if the calculated angle (θ) of the link is 0°≦θ<180° and the second point is the display reference position if the calculated angle (θ) of the link is not 0°≦θ<180°.

The display position information includes a start point to display the road name, an angle to display the road name, and a length of the road name.

The road name is displayed at an angle designated by the display position information and offset from a reference display position by a preset interval.

DETAILED DESCRIPTION

Figure 1:
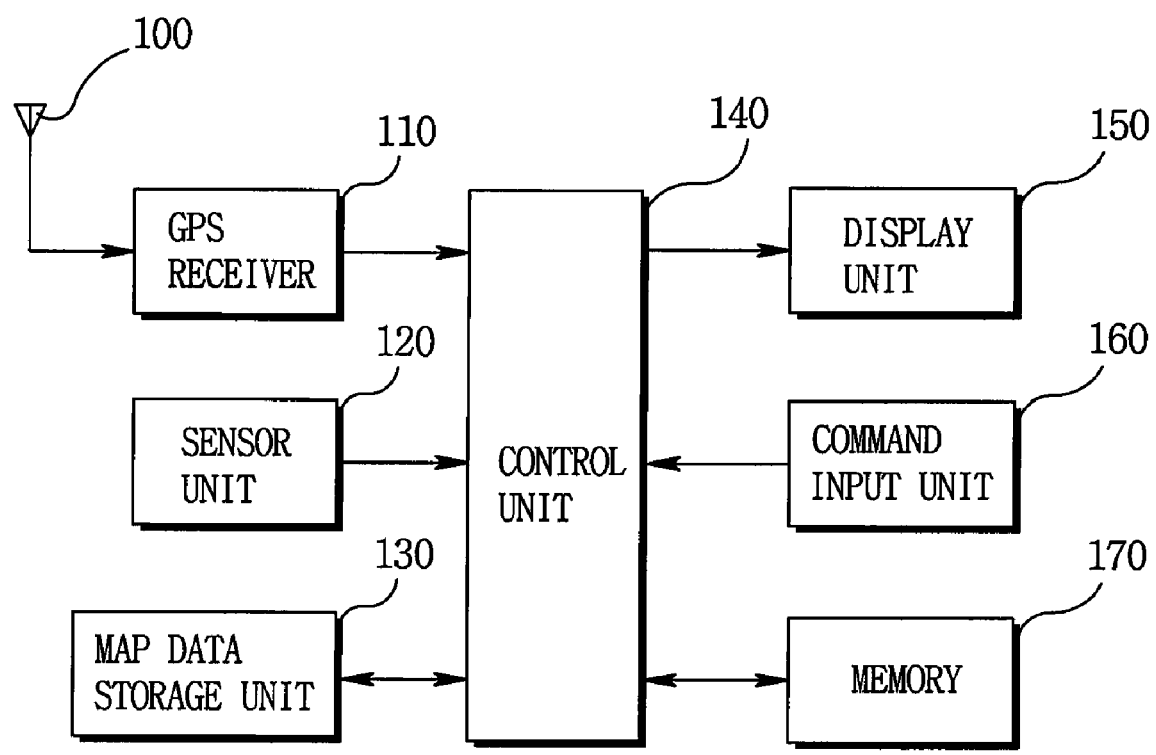
FIG. 1 is a block diagram of a navigation system.

Referring to FIG. 1, a navigation system includes a GPS receiver 110 and a sensor unit 120. The GPS receiver 110 receives navigation messages transmitted from a plurality of GPS satellites (not shown). The GPS receiver 110 calculates and outputs a value of DOP (dilution of precision) indicating a degree of reliability of the received navigation message. The sensor unit 120 may include a gyroscope for detecting a drive angle of the moving object, and one or more various sensors, such as a speed sensor, for detecting a drive speed of the moving object and the like. The sensor unit 120 is configured to detect a driving or operating state of the moving object, such as a motor vehicle. The sensor unit 120 outputs a drive state detecting signal.

The navigation system includes a map data storage unit 130 and a control unit 140. The map data storage unit 130 stores map data in advance for searching a drive path of the moving object and for guiding the drive path. The control unit 140 determines a current position of the moving object by mixed navigation using the navigation messages received by the GPS receiver 110 and the drive state detecting signal of the moving object detected by the sensor unit 120. The control unit 140 searches the drive path from an origination to a destination using the map data stored in the map data storage unit 130. The control unit 140 controls the matching of the determined current position of the moving object with the corresponding map data for display. The control unit 140 guides the moving object along the searched drive path by providing instructions and position information to the display unit for displaying and/or audio cues, such as through a speaker. The control unit 140 determines a position to display the name of a road according to a display position determining process.

The navigation system includes a display unit 150 for displaying the map data, the current position of the moving object, the drive path of the moving object, and the road name(s) of roads within a perimeter at the corresponding display positions determined by the control unit 140.

The navigation system includes a command input unit 160 which includes a plurality of function keys, generates an operation command according to user's manipulation of a plurality of the function keys, and inputs the generated operation command to the control unit 140. A memory 170 stores work data of the control unit 140.

A process performed, for example, by the control unit 140, for determining display position(s) of road name data will be described in greater detail hereinafter. First, the control unit 140 determines a display position by extracting road name data from data of a map stored in the map data storage unit 130. Information of the determined display positions may be stored in the map data storage unit 130.

Figure 3A:
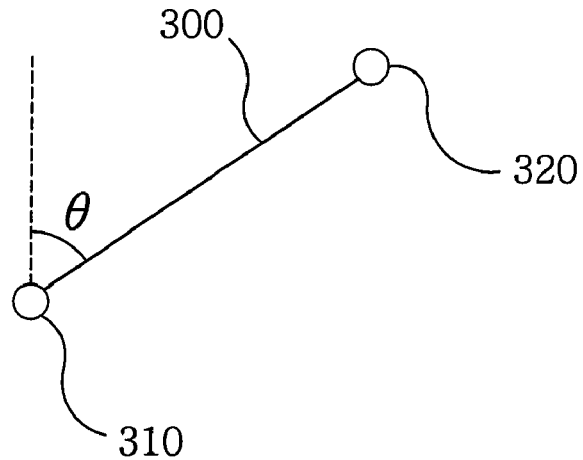
FIGS. 3a to 4c are schematic views useful in illustrating a process for determining a display position of a road name according to an angle of a link.
Figure 3B:
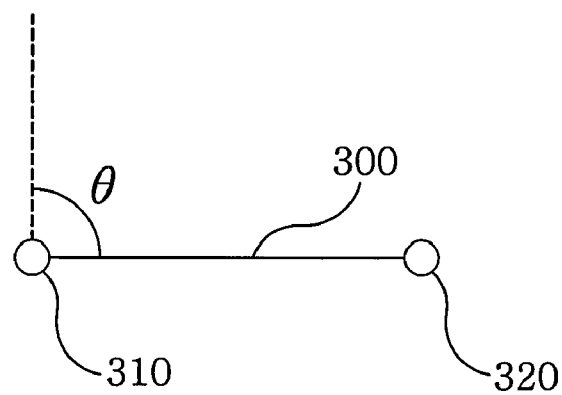
Figure 3C:
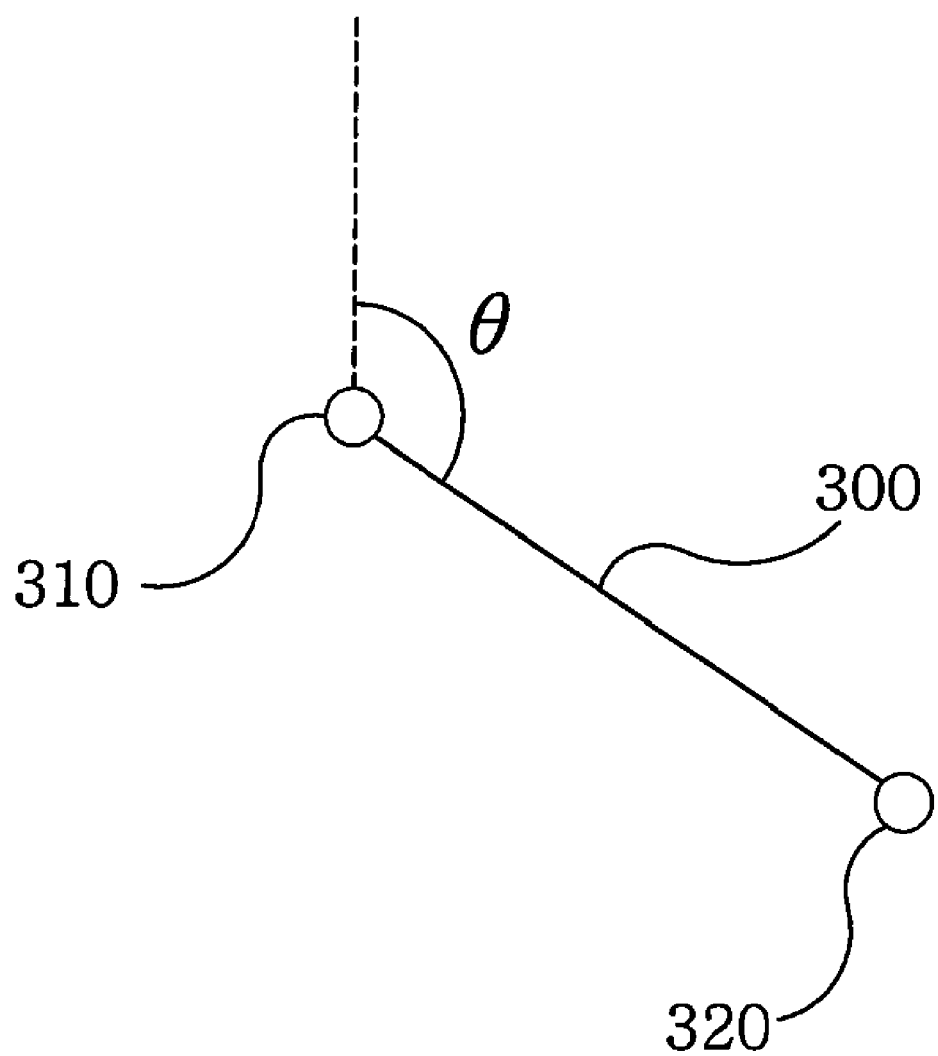

The determination of the display position may be carried out in a manner shown in FIGS. 3a to 3c. Specifically, the control unit 140 selects one or more links, such as a road or highway segment within a target area or perimeter of a moving object, to display a display position of a road name from a plurality of map data stored in the map data storage unit 130 (S200). Coordinates of a start node and end node of the selected link are provided (S202 and S204), respectively, from stored position data for the link, manually inputted by a cartographer, or position data acquired by the control unit 140 through hybrid navigation using a GPS receiver and/or sensor unit.

An angle of the end node is calculated by taking the start node as a reference (S206). In particular, the start node of the link is set as a start point for calculating the angle of the link and the end node is set as an end point for calculating the angle of the link. By taking a true north direction as a reference at the start point, the angle θ of the link is calculated with reference to a clockwise direction toward the end node.

Once the angle of the link is calculated, it is determined whether the calculated angle θ of the link is $0°\leqq\theta<180°$ (S208). If the calculated angle θ of the link is $0°\leqq\theta<180°$, the start point is determined as a display reference position to display the road name (S210). The start point is stored as display position information corresponding to the road name in the map data storage unit 130 (S212). The display position information includes the road name, the coordinates of the start node stored as a start point for displaying the road name, the angle θ of the link stored as the angle to display the road name, and a length of the road name.

For instance, referring to FIGS. 3a to 3c, a start node 310 and an end node 320 of a link 300 are set as a start point and an end point, respectively. An angle θ of a link in a direction of the end point is calculated clockwise from the start point by taking a north direction as a reference. If the angle θ of the link is $0°\leqq\theta<180°$, as shown in FIGS. 3a, 3b and 3c, the start point is determined as a display reference position to display the road name. Coordinates of the start node as a point for starting to display the road name, the angle θ of the link as the angle to display the road name and a length of the road name are stored as display position information for the road name in the map data storage unit 130.

If the angle θ of the link is not $0°\leqq\theta<180°$, an angle θ' of the link is calculated by subtracting 180° from the angle θ of the link (S214). In this case, the end point of the link is determined as the display reference position to display the road name (S216). The display position information of the road name is then stored in the map data storage unit 130 (S218).

Figure 4A:
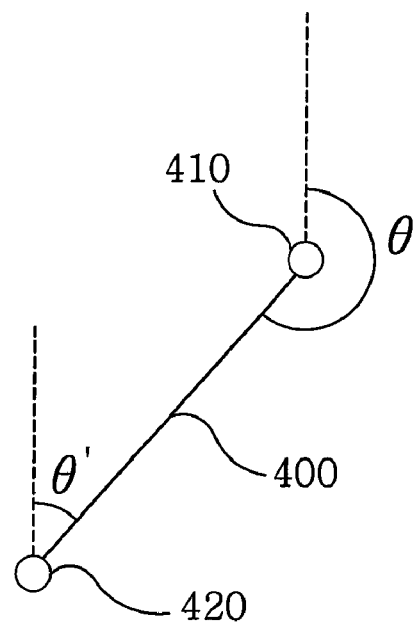
Figure 4B:
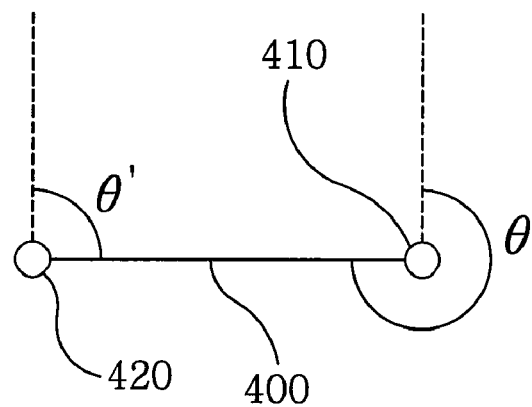
Figure 4C:
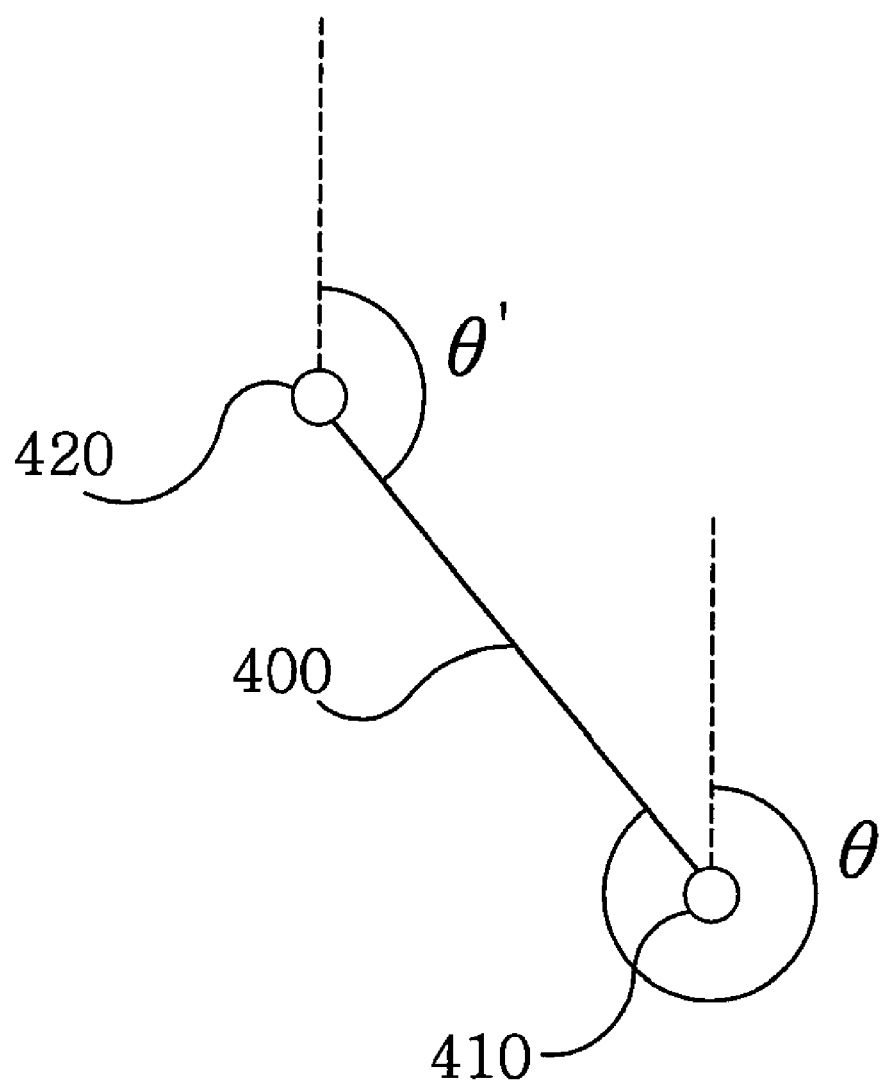

In another instance, referring to FIGS. 4a to 4c, a start node 410 and an end node 420 of a link 400 are set as a start point and an end point, respectively. An angle θ of the link is then calculated. If the calculated angle θ of the link 400 is not $0°\leqq\theta<180°$, an angle θ' of the link is calculated clockwise from the end point in a direction of the start node by subtracting 180° from the angle θ of the link by taking a true north direction as a reference. Coordinates of the end node as a point of starting to display the road name, the angle θ of the link as the angle to display the road name and a length of the road name are stored as display position information of the road name in the map data storage unit 130.

After completion of storing the display position information corresponding to the road name for one link, the control unit 140 decides whether display positions for all of the road name data should be determined (S220), e.g., for other links within the perimeter of the moving object. For example, for a given perimeter, a plurality of links may have undesignated display position information for road names corresponding to each link. The links may be selected and display position information determined based on distance from the moving object, in order of link importance, such as a primary or secondary road, etc. If all of the display positions of the road name data have yet been determined, it goes back to the step S200 to repeat an operation of determining a display position of a road name by selecting a next link to determine a display position of a road name and by calculating an angle of the selected link. If all of the display positions for all of the road name data are determined, the operation of determining the display positions of road names is ended.

Figure 5:
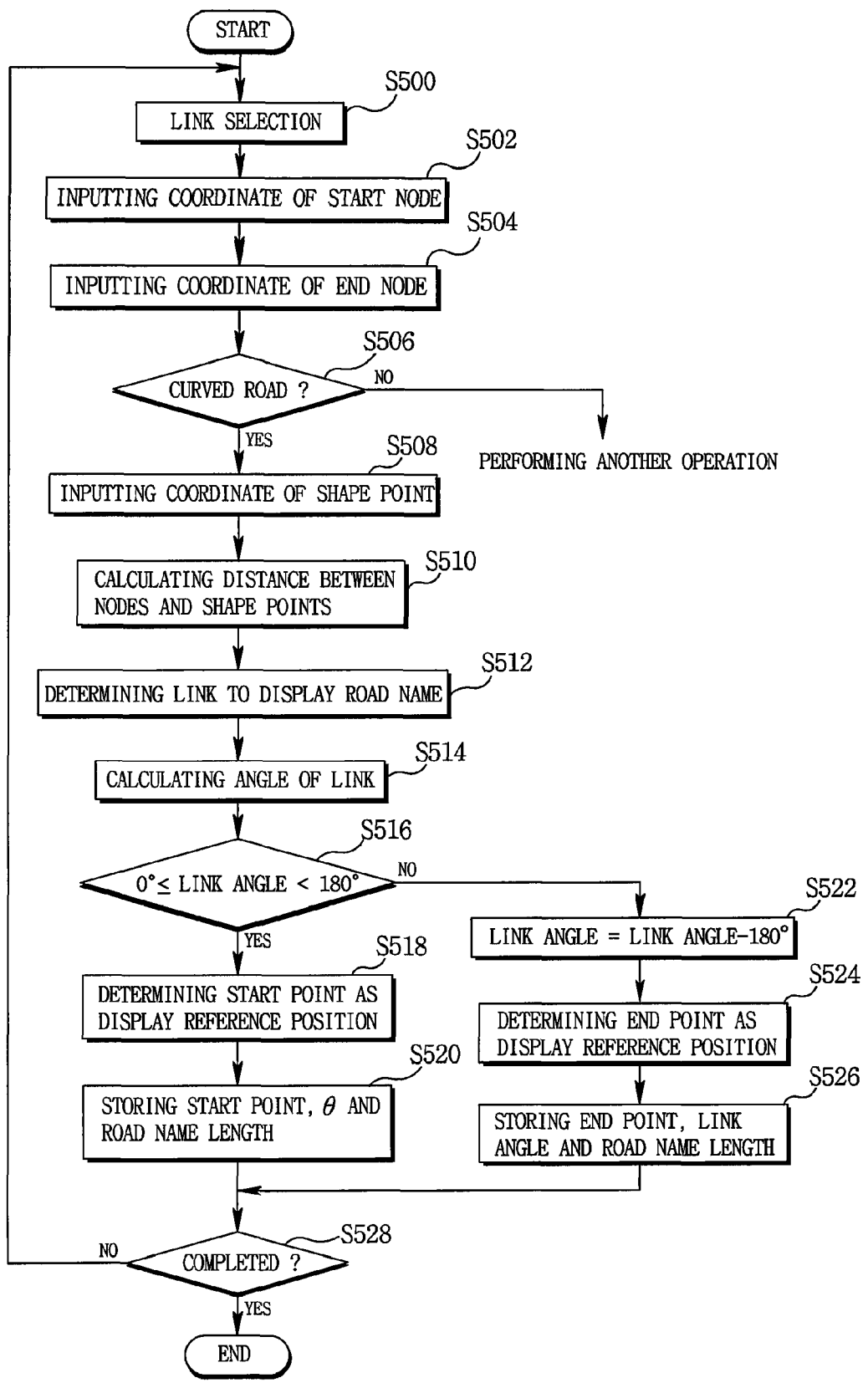
FIG. 5 is a flowchart of a process for determining a display position of a road name.

FIG. 5 is a flowchart of a process for determining a display position of a road name when a link represents a curved road. Referring to FIG. 5, the control unit 140 selects one link for which to display a road name display position based on map data stored in the map data storage unit 130 (S500). Coordinates of a start node of the selected link are inputted (S502) manually or automatically, and coordinates of an end node of the selected link are inputted (S504). It is then decided whether the link is a curved road (S506).

In particular, a road is represented as a line having start and end nodes linked together. If the road is a curved road, shape point information for a curved line location between the start and end nodes is stored in the map data storage unit 130. For example, presence or non-presence of the curved road is decided by presence or non-presence of the shape point information between the start and end nodes of the link. If the shape point information exists between the start and end nodes of the link, the corresponding road is determined to be the curved road. If the shape point information does not exist between the start and end nodes of the link, the corresponding road is determined to be a straight road.

If the road is determined to be a straight road, e.g., it is decided that shape point information does not exist between the start and end nodes of the link, a road name display position is determined in the same manner as described hereinabove with respect to FIGS. 3a to 3c. The road name display position information is then stored in the map data storage unit 130.

However, if the road is identified as a curved road based upon the presence of shape point information between the start and end nodes of the link, numerous coordinates defining a shape point located between the start and end nodes are inputted (S508), e.g., distances between the start node, the shape point and the end node are calculated (S510). A link between two points having the greatest calculated distance is then decided as a link in which a road name (S512) for the curved road should be displayed. Accordingly, if a curved road is encountered, the road name is positioned in a location having the longest distance between adjacent nodes or shape points.

Figure 6A:
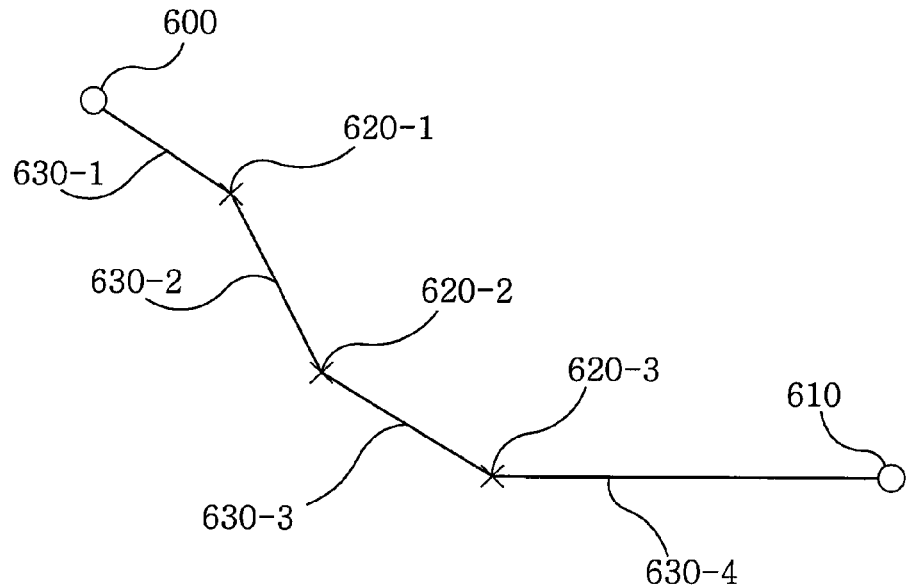
FIGS. 6a to 6b are schematic views useful in illustrating a process for determining a display position of a road name.
Figure 6B:
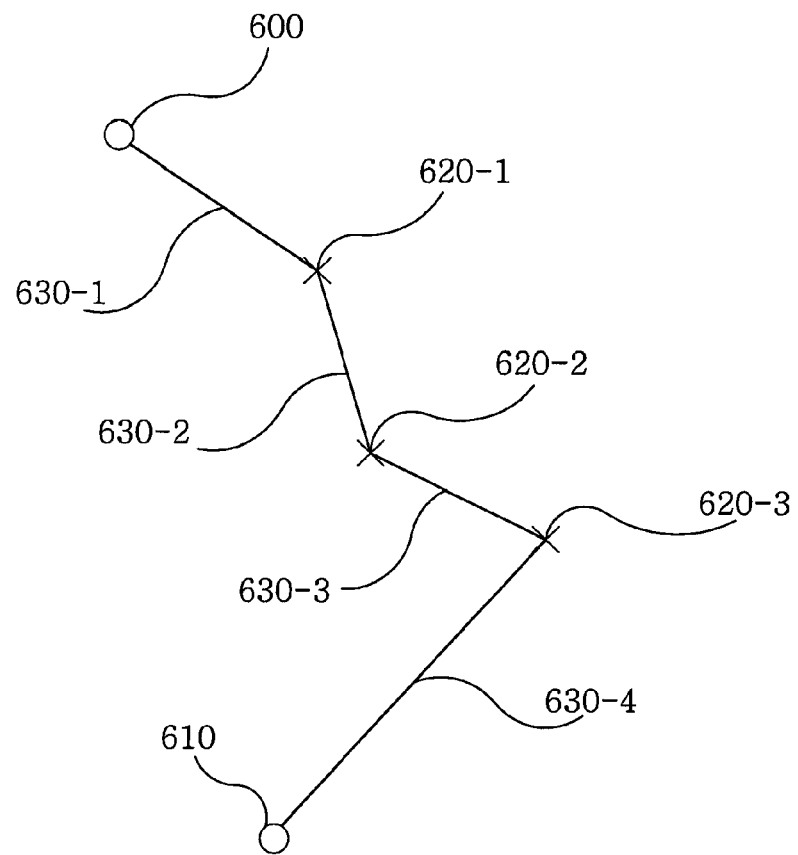

For example, assuming a curved road, as shown in FIG. 6A and FIG. 6B, having a plurality of shape points 620-1, 620-2 and 620-3 between start and end nodes 600 and 610, respectively of a link, a distance of a link 630-1 between the start node 600 and the shape point 620-1, distances of links 630-2 and 630-3 between a plurality of the shape points 620-1, 620-2 and 620-3, and a distance of a link 630-4 between the shape point 620-3 and the end node 610 are all calculated (S510). As a result of the calculations, the link 630-4 having the greatest distance, e.g., link 630-4 between the shape point 620-3 and the end node 610, is then determined as the link to display the road name (S512). Alternatively, or in addition to, the link 630-4 may be a link not having the greatest distance between points, if another criteria is also utilized, such as defaulting to a link having the greatest distance and still being positioned generally horizontally or vertically with respect to a display.

If the link 630-4 is determined as the best display position for the road name, the shape point 620-3 and the end node 610 are stored as both ends of the link 630-4, e.g., as a first point and a second point for the display position, respectively. An angle of the link 630-4 between the first and second points is calculated.

In this case, the calculation of the angle θ of the link 630-4 is determined with respect to the first point, which is closer to the start node 600, and in a direction of the second point, which is closer to the end node 610. In particular, the angle θ of the link 630-4 is calculated in a direction of the end node 610 (as the second point) that is clockwise from the shape point 620-3 (as the first point) and with reference to a true north direction.

Once the angle θ of the link 630-4 is calculated, it is decided whether the angle θ of the link 630-4 is 0°≦θ<180° (S516). If the angle θ of the link 630-4, as shown in FIG. 6a, is 0°≦θ<180°, coordinates of the shape point 620-3 (as the first point) are determined as a display reference position to display a road name (S518). The coordinates of the shape point 620-3 as the display reference position, the angle θ of the link and a length of the road name are stored as road name display position information in the map data storage unit 130 (S520).

If the angle θ of the link 630-4, as shown in FIG. 6b, is not 0°≦θ<180°, an angle θ' of the link 630-4 is determined by subtracting 180° from the calculated angle θ of the link 630-4 (S522). Namely, the angle θ' of the link 630-4 in the direction of the shape point 620-3 (as the first point) is determined from the end node 610 as the second point. Once the angle θ' of the link 630-4 is determined, the end node 610 (as the second point) of the link 630-4 is determined as a display reference position to display the road name (S524). Coordinates of the end point 610, the angle θ' of the link 630-4 and a length of the road name are stored as display position information in the map data storage unit 130 (S526).

Subsequently, it is determined if display positions of all of the road name data have been determined (S528). If all of the display positions of the road name data are determined, the process returns to the step S500 to repeat an operation of deciding a road name display position in a manner of selecting a next link, deciding whether the next link is a curved road, detecting two points having the longest link in case of the curved road, and calculating a link angle between the two detected points. If the all of the display positions of the road name data has been determined, the road name display position determining operation is terminated.

Figure 2:
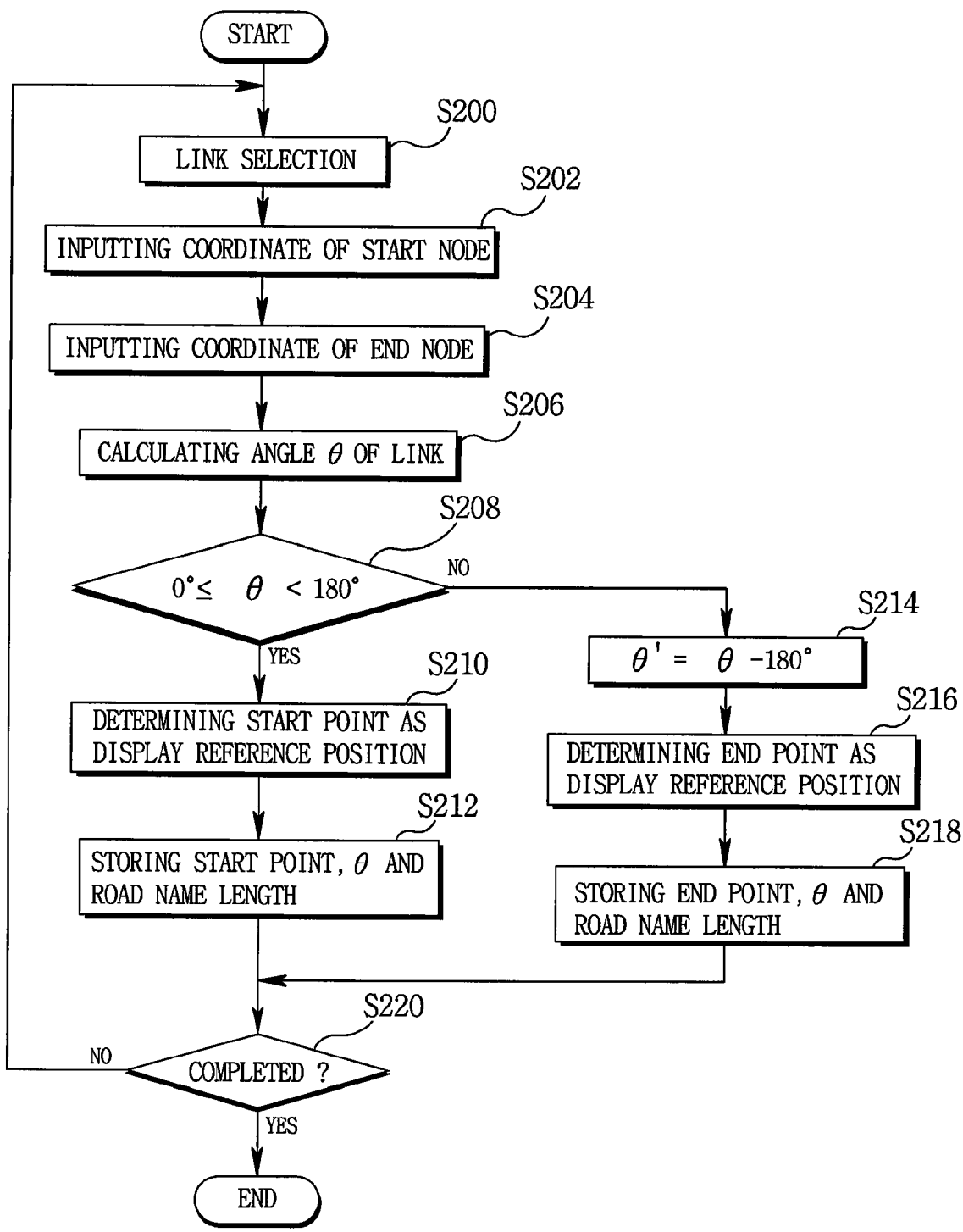
FIG. 2 is a flowchart of a process for determining a display position of road name data.

The determination of road name display positions shown in FIGS. 3a to 6b have been explained in a manner that the control unit 140 of the navigation system shown in FIG. 2 reads the map data stored in the map data storage unit 130 to determine the road name display position for example. Optionally, a cartographer making the original map data previously determines road name display positions by storing the display position information in the map data storage unit 130 (but calculated by the same process described in connection with FIGS. 3a to 6b).

Figure 7:
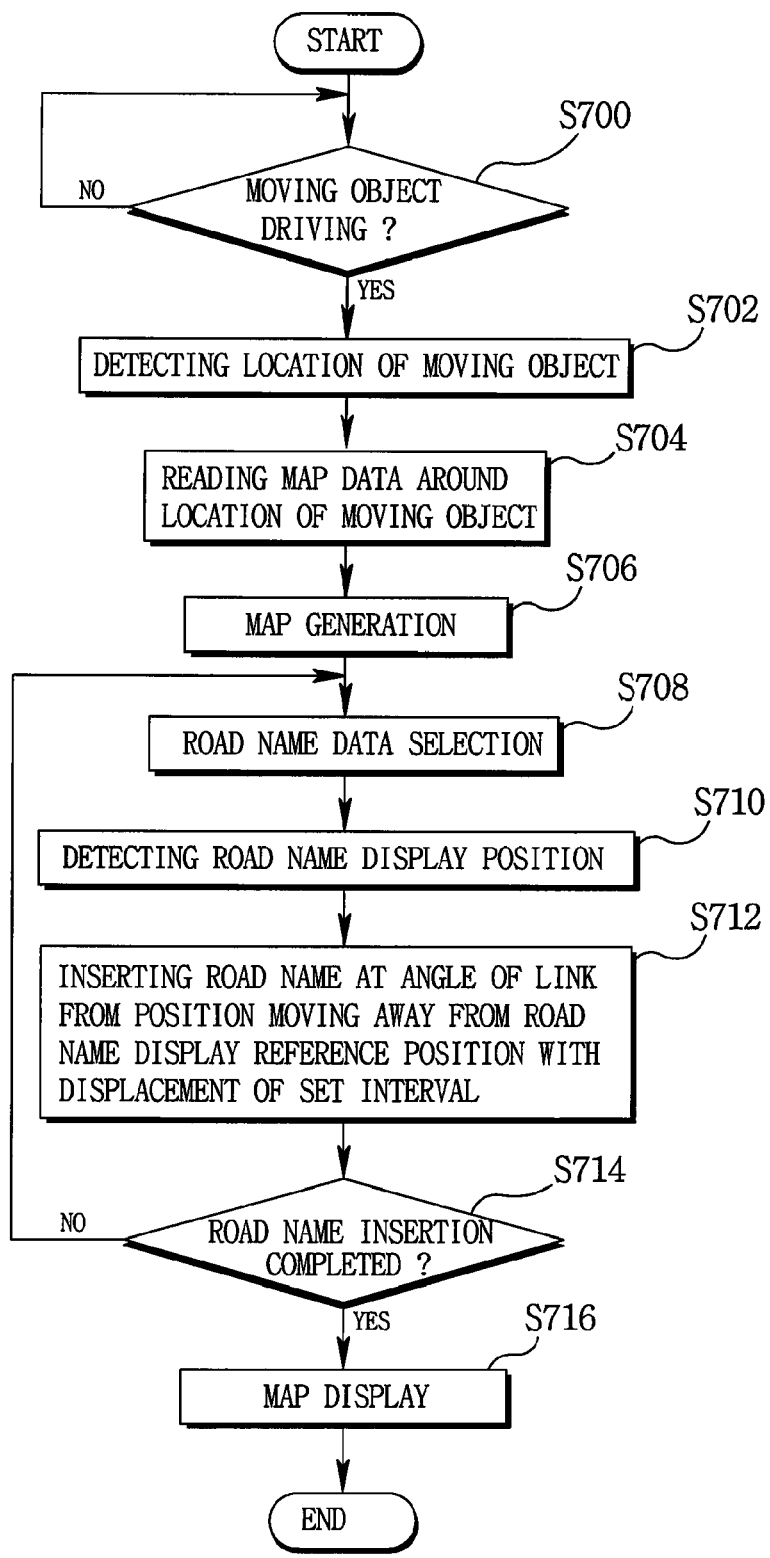
FIG. 7 is a flowchart of a process for displaying road name data.

FIG. 7 is a flowchart of a method for displaying a road name in a display position determined by the process described hereinabove with respect to FIG. 2 and FIG. 5. Referring to FIG. 7, the control unit 140 determines if a moving object, such as a motor vehicle, is driving using a detection signal of the sensor unit 120 (S700). If the moving object is driving, a current location of the moving object is detected by hybrid navigation, e.g., using a navigation message received by the GPS receiver 110 and a drive state detecting signal of the moving object detected by the sensor unit 120 (S702).

For example, the GPS receiver 110 receives the navigation message and then outputs a value of DOP (dilution of precision) using the received navigation message. The value of DOP is low if the current location of the moving object detected via the received navigation message is reliable. The value of DOP is high if the current location of the moving object detected via the received navigation message is unreliable.

The control unit 140 determines the reliability of the navigation message via the DOP value outputted from the GPS receiver 110. If the navigation message is reliable, the current location of the moving object is detected via the data from the navigation message. If the navigation message is unreliable, the current location of the moving object is detected by hybrid navigation for detecting the current location of the moving object based on a final location of the moving object detected via the reliable navigation message using the drive state detection signal of the sensor unit 120.

If the current location of the moving object is detected, the control unit 140 reads the map data of a prescribed area around the current location of the moving object from the map data storage unit 130 (S704) and then generates a map, e.g., without including road names (S706).

The control unit 140 selects a first set of road name data (S708) and then detects road name display position information for the selected road name data (S710). In particular, the control unit 140 detects a road name display reference position, an angle of a link to display a road name and a length of the road name. Optionally, instead of storing in advance the road name display position information in the map data storage unit 130, the control unit 140 can select links to display their road names, respectively from a plurality of links to display on the display unit 150 individually and then acquires the road name display position information to use according to the process described in either of FIG. 2 or FIG. 5.

If the road name display position information is detected, the control unit 140 inserts the corresponding road name data at a position permitting the road name data, e.g., large enough to accommodate the full or abbreviated length of the road name, to be displayed at the reference position (S712). For instance, the road name amounting to the road name length is inserted at the reference position, at the angle of the link, and spaced apart as long as the interval permits while still enabling a display of one or two characters.

In this case, the position of the road name moves by a preset interval from the road name display reference position as the vehicle is moving so that the road name is always displayed in a position having sufficient length to accommodate the road name. The road name may continue to be displayed until the road name approaches the end of the link, e.g., comes within one or two characters of overlapping onto another link. This is to prevent the road name from overlapping with another road name, e.g., at an intersection or the like, if the road name is displayed from the road name display reference position.

The control unit 140 then determines if the insertions of all of the road names is completed (S714). If the insertions of all of the road names is not completed, the process goes back to the step S708 to repeat an operation of selecting road name data, extracting display position information for the selected road name data and inserting a road name in preferred locations.

If the insertions of the entire road name are completed, the control unit 140 outputs the road name data to display a completed map on the display unit 150 (S716). Therefore, instead of manually determining the position to display the road name by the cartographer of the map data, the control unit 140 determines the road name display position using the angle of the link to display the road name. In the case of a curved road, the link to display the road name is determined using the start node, the end node and the shape point, and the control unit 140 then determines the road name display position using the angle of the link to display the road name. Accordingly, the foregoing implementations can accurately deliver the information of the perimeter area to a user by minimizing the occurrence of overlapping road names displayed on the map. Road names can be displayed and accurately identify a road system in a downtown area having a complicated road system, a residential street area, an interchange having a plurality of circular or curved roads, and the like.

A system or method may determine a display position of road name data, by which display positions for road names are automatically and simply determined. A curved road is searched for an optimal position for displaying a road name using node information and shape point information of the curved road, by which the optimal position for the road name data is determined as a display position of the road name.

It should be understood that the above-described implementations are not limited by any of the details of the foregoing description. Accordingly, other implementations are within the scope of the following claims.

What is claimed is:

1. A method of determining a display position for road name data in a navigation system, comprising:
   selecting a link representing a road segment from stored map data of the navigation system, the link having a start point and an end point;
   calculating an angle in a direction of the end point of the selected link, clockwise from the start point of the selected link and with reference to a true north direction;
   comparing the calculated angle to a threshold angle with respect to the reference true north direction the threshold angle being an angle of 180° clockwise with respect to the true north direction;
   determining whether the calculated angle is less than or greater than the threshold angle;
   based on results of determining whether the calculated angle is less than or greater than the threshold angle, setting the start point of the reference link as a display reference position if the calculated angle (θ) of the link is $0°\leq θ<180°$; and setting the end point of the reference link as the display reference position if the calculated angle (θ) of the link is not $0°\leq θ<180°$; and
   storing, in memory of the navigation system, road name display position information as including the set display reference position.

2. The method of claim 1, wherein the road name display position information includes the set display reference position, an angle to display the road name and a length of the road name.

3. The method of claim 2, wherein the set display reference position is a start point at which to display the road name.

4. The method of claim 2, wherein:
   the reference direction is a true north direction; and
   the angle to display the road name is an angle between the end point and the start point of the selected link and the true north direction.

5. A method for determining a display position for road name data in a navigation system, the method comprising:
   selecting links representing a road segment in a route, the road segment including a start node, one or more shape points, and an end node;
   acquiring information of a start point and an end point for each of the selected links, the start point being defined by one of the start node of the road segment or a shape point of the road segment and the end point being defined by one of a shape point of the road segment or the end node of the road segment;
   calculating, based on the acquired information of the start point and the end point for each of the selected links, a length of each of the selected links;
   comparing the calculated length of each of the selected links;
   selecting, based on the comparison of the calculated length of each of the selected links, a link of the road segment as a reference link;
   calculating an angle in a direction of the end point of the reference link, clockwise from the start point of the reference link and with reference to a true north direction;
   comparing the calculated angle to a threshold angle with respect to the true north direction the threshold angle being an angle of 180° clockwise with respect to the true north direction;
   determining whether the calculated angle is less than or greater than the threshold angle;
   based on results of determining whether the calculated angle is less than or greater than the threshold angle, setting the start point of the reference link as a display reference position if the calculated angle (θ) of the link is $0°\leq θ<180°$; and setting the end point of the reference link as the display reference position if the calculated angle (θ) of the link is not $0°\leq θ<180°$; and
   storing, in memory of the navigation system, road name display position information as including the set display reference position.

6. The method of claim 5, wherein the road name display position information includes the set display reference position, an angle to display the road name, and a length of the road name.

7. The method of claim 6, wherein the set display reference position is a start point at which to display the road name.

8. The method of claim 6, wherein:
   the reference direction is a true north direction; and
   the angle to display the road name is an angle between the end point and the start point of the reference link and the true north direction.

* * * * *